No. 642,743. Patented Feb. 6, 1900.
S. EVERSHED.
COMMUTATOR FOR ELECTRIC MOTORS OR GENERATORS.
(Application filed Sept. 15, 1899.)
(No Model.)
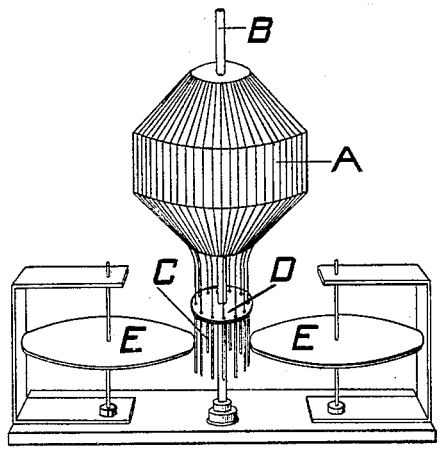
FIG.1.
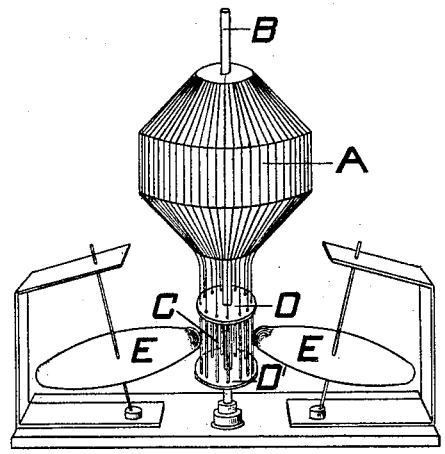
FIG.2.
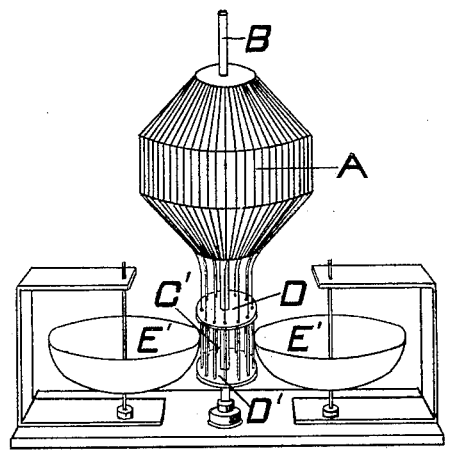
FIG.3.
FIG.4.
WITNESSES:
Ella L. Giles
INVENTOR
Sydney Evershed
BY
ATTORNEYS

UNITED STATES PATENT OFFICE.

SYDNEY EVERSHED, OF LONDON, ENGLAND, ASSIGNOR TO HIMSELF AND THE EVERSHED & VIGNOLES, LIMITED, OF SAME PLACE.

COMMUTATOR FOR ELECTRIC MOTORS OR GENERATORS.

SPECIFICATION forming part of Letters Patent No. 642,743, dated February 6, 1900.

Application filed September 15, 1899. Serial No. 730,605. (No model.)

*To all whom it may concern:*

Be it known that I, SYDNEY EVERSHED, a subject of the Queen of Great Britain and Ireland, residing at London, England, have invented new and Improved Means for Commutating Contact in Electric Motors or Generators, (for which I have made application for Letters Patent in Great Britain under No. 13,616, bearing date June 30, 1899,) of which the following is a specification.

This invention relates to the construction of commutators and brushes of electric motors and generators making elastic rolling contact where it is desired that the relative contact of such commutators and brushes should offer the least frictional resistance to rotation; and it consists of means whereby the mutual contact between the commutator and brushes is always elastic, thus giving effective electrical contact with least pressure, and the brushes themselves being rotary and of large diameter as regards their faces in contact with the commutator as compared with the diameter of their supporting-axes offer large mechanical advantage to the contact between commutator and brushes in overcoming any frictional resistance of the axial support of the rotary brushes.

Figure 1 is a perspective elevation of any armature with vertical depending elastic-wire commutator in contact with disk brushes presented horizontally to said commutator. Fig. 2 is a perspective elevation of a vertical cage wire commutator, with thin elastic disk brushes presented obliquely to said commutator. Fig. 3 is a perspective elevation of a cage wire commutator and elastic bowl brushes making contact therewith. Fig. 4 is a perspective elevation of a horizontal-spoke elastic-wire commutator and vertical disk brushes making under contact therewith.

Like letters refer to similar parts in the various figures.

A is any rotating armature of any electric motor or generator having an axle B, which is shown conveniently vertical, but may be horizontal or otherwise disposed.

C, C', and $C^2$ are conducting commutator-sections, (shown conveniently as naked wires,) with air-spaces between them and supported in either one or two insulating-collets D D', according to whether it is desired that the commutator-bars shall be elastic, where the rotary brushes are rigid, or whether the commutator-bars may be rigid, when the rotary brushes are elastic relative to the commutator-bars.

E E' are rotary brushes conveniently of thin elastic sheet metal, though in the cases shown in Figs. 1 and 4, where the elasticity is provided in the commutator, the disk brushes may be substantial in section or periphery and even rigid.

In Fig. 1 the commutator-wires C, which are supported in the upper insulating-collet D, are entirely free from restraint at their lower ends, so that the wires are able elastically to adapt themselves to any irregularities in the peripheries of the disk brushes E, which may thus be rigid and which roll upon the said commutator-wires C as the armature revolves.

In Fig. 2 the commutator-wires C' are fixed in two insulating-collets D D', and the disk brushes E E, of thin metal sheet, are placed with their axes oblique to that of the armature, so that the disks are presented obliquely to the comparatively rigid commutator-wires C' and will therefore elastically bend at the edge, and present thus a large and yielding surface of contact to the wires C'.

In Fig. 3 a comparatively rigid cage wire commutator C' is combined with bowl-shaped disk brushes E', the edges of which will elastically yield to the pressure and contact of the wires C'.

In Fig. 4 the commutator-wires $C^2$ are extended radially from the insulating-collet D, and the disk brushes E, which may be comparatively rigid and of considerable width of periphery, will find elastic and yielding contact from the radial spoke-wires $C^2$, which are perfectly free at the outer end.

By the above means and other similar and equivalent modifications a reliable and elastic contact between the commutator-sections and the rotary brushes is made, the rotary movement of the latter having large mechanical advantage over any frictional resistance of their spindles, thus affording a means for commutation of electrical currents, offering the minimum resistance to the rotation of the armature and a minimum liability for the commutator-sections to clog with dust or to short-circuit.

Having now described my invention, what I claim, and desire to protect by Letters Patent, is—

1. In an electric motor or generator, a multisection-commutator, adapted for drum or Gramme windings, having conducting-strips, formed of resilient wires, fixed at one end in an insulating-collet, and free to bend at the other; in combination with rotating metallic-sheet brushes, adapted to make elastic rolling contact successively with all the said resilient-wire strips, substantially as described.

2. In an electric motor or generator, a multisection-commutator, adapted for drum or Gramme windings, having insulated conducting-sections, parallel to the axis of rotation of the armature, all passing successively over the same commutating-contacts, in combination with rotary metal-sheet brushes, having continuous resilient periphery of bowl form, forming elastic rolling contacts to the commutator, and rotated thereby, substantially as described.

In witness whereof I have hereunto set my hand in presence of two witnesses.

SYDNEY EVERSHED.

Witnesses:
T. M. TULEY,
J. D. TOY.